United States Patent [19]
Patterson

[11] Patent Number: 6,082,696
[45] Date of Patent: Jul. 4, 2000

[54] SUPPORT STAND FOR AN ELECTRONIC DEVICE

[75] Inventor: Gregory S. Patterson, Morrisville, N.C.

[73] Assignee: Ericsson, Inc., Research Triangle Park, N.C.

[21] Appl. No.: 09/088,263

[22] Filed: Jun. 1, 1998

[51] Int. Cl.[7] ...................................................... A47G 1/24
[52] U.S. Cl. ........................... 248/454; 248/447; 248/448
[58] Field of Search ..................................... 248/454, 447, 248/448, 455, 457, 462, 167, 434, 173, 149, 172

[56] References Cited

U.S. PATENT DOCUMENTS

| | | | |
|---|---|---|---|
| 4,726,556 | 2/1988 | Weir | 248/454 |
| 4,767,111 | 8/1988 | Guenther | 248/454 |
| 5,607,135 | 3/1997 | Yamada | 248/454 |

*Primary Examiner*—Timothy V. Eley
*Assistant Examiner*—Willie Berry, Jr.
*Attorney, Agent, or Firm*—Coats & Bennett, P.L.L.C.

[57] ABSTRACT

A support stand includes a plurality of generally planar support members pivotally connected to one another. The stand attaches to the bottom of an electronic device. The support members are movable between a storage position in which all of the support members lie in a single plane against the bottom of the electronic device, and a deployed position in which the electronic device is supported in an inclined position. A latch retains the stand in the storage position when it is not in use.

27 Claims, 8 Drawing Sheets

SUPPORT STAND FOR AN ELECTRONIC DEVICE

FIELD OF THE INVENTION

The present invention relates generally to support stand for an electronic device, which enables the device to be supported in an inclined position, and, more particularly, to a collapsible support stand for an electronic device.

BACKGROUND OF THE INVENTION

Recent advances in electronics have led to the development of small electronic devices, such as computers and wireless telephones. Such devices are frequently portable and may be carried from one location to another. During use, such devices are typically placed on a desktop or other flat support surface. In many instances, it is desirable, to support the electronic device in an inclined position to make it easier to use.

In the past, electronic devices have been made with built-in support feet to support the device in an inclined position. The support feet are typically disposed within a recess on the backside of the electronic device's housing. The support feet pivot between the storage position and a deployed position. In the storage position, the support feet are disposed entirely within the recess so that the electronic device rests flat on the support surface. In the deployed position, the support feet extend downward from the housing to support the electronic device in an inclined position.

Built-in support feet have been used very successfully in full-size keyboards for desktop computers. However, this type of supporting device has several drawbacks. First, built-in support feet provide only a few degrees of angle. Therefore, they are not suitable for applications where larger angles are required. Second, built-in support feet require a substantial amount of room in the electronic device's housing to accommodate the support feet in the closed position or storage position. Thus, built-in support feet may not be practical for small electronic devices having only a limited amount of space. Third, built-in support feet are not adjustable.

Another approach that has been used in the past is to provide a separate support stand for the electronic device. One advantage of using a separate support stand is that it can be used in applications where the viewing angle is more than a couple of degrees, or in applications where there is not sufficient room in the electronic device to accommodate recessed support feet. However, the use of a separate support stand also has its disadvantages. Most support stands are not adjustable and therefore do not provide the user with a choice as to the desired viewing angle. Further, support stands are typically bulky and require a substantial amount of space for storage. Moreover, if the electronic device is portable, the user must either carry the support stand or do without the stand when traveling. Neither of these options fully meets the user's needs.

SUMMARY OF THE INVENTION

The invention is a portable, adjustable stand that is particularly adapted for use with small, desktop electronic devices. The stand comprises a plurality of generally planar support members pivotally connected to one another. The stand attaches to the underside of the electronic device. The support members are movable between a closed, storage position and an open, deployed position. In the storage position, the support members lie in a single plane against the underside of the electronic device. In the deployed position, the support members are configured to support the electronic device in an inclined position.

One of the planar support members, referred to herein as the base member, attaches to the underside of the electronic device. The base member may be attached, for example, by means of screws which thread into the bottom of the electronic device. The second support member, referred to herein as the foot member, has a first edge which is pivotally connected to the base member and a second edge which engages a support surface when the stand is in a deployed position. The third support member, referred to herein as a support arm, has a first edge pivotally connected to the foot member and a second edge that engages the back of the electronic device when the stand is in the deployed position. The stand is preferably provided with a latch that is engageable with the electronic device to secure the stand in the closed or storage position when not in use.

In the preferred embodiment of the invention, the stand is manufactured using insert-molding technology. Each support member comprises an insert made of a rigid sheet material, such as sheet metal, and a molded outer covering encapsulating the insert. In addition to covering the inserts, the outer covering forms live hinges between the support members. This eliminates the need for conventional hinges or pins to connect the support members to one another. It also creates an integral unit, which does not require extensive secondary assembly operations.

The combination of rigid inserts with a soft durometer covering allows for a compact design while retaining sufficient strength to support the electronic devices. Using a soft durometer material alone could not meet the load requirements for supporting the electronic device. Using metal alone would have required some type of hinging mechanism to allow the unit to be moved between the storage position and the deployed position.

Another advantage is that the soft durometer outer covering provides a non-slip surface for the electronic device to rest on. This reduces the tendency for the unit to slide across the desk surface. Further, the soft durometer material provides a more aesthetically pleasing look and feel for consumers of the product.

DETAILED DESCRIPTION OF THE INVENTION

Figure 1:
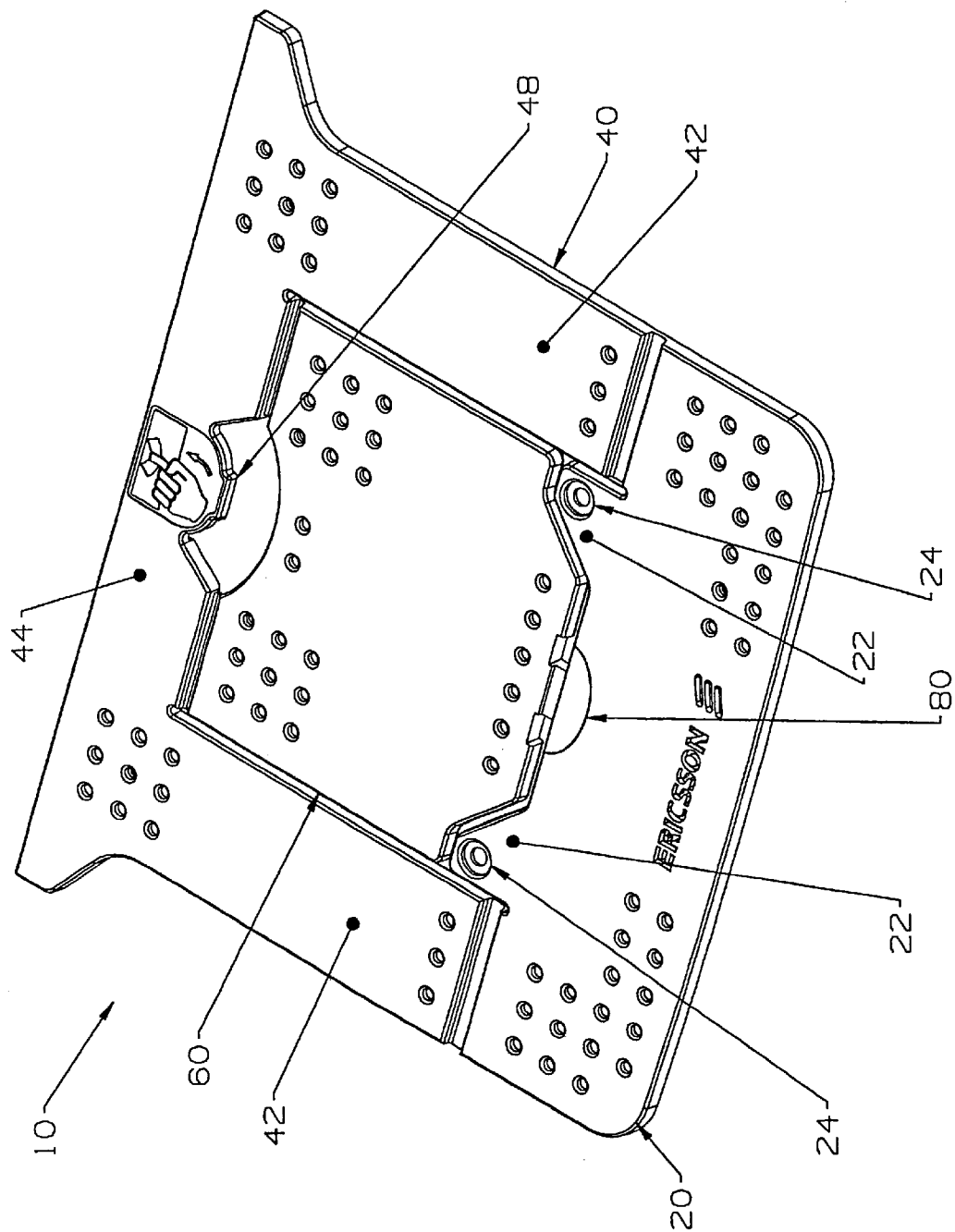
FIG. 1 is a perspective view of the support stand of the present invention as seen from below.
Figure 2:
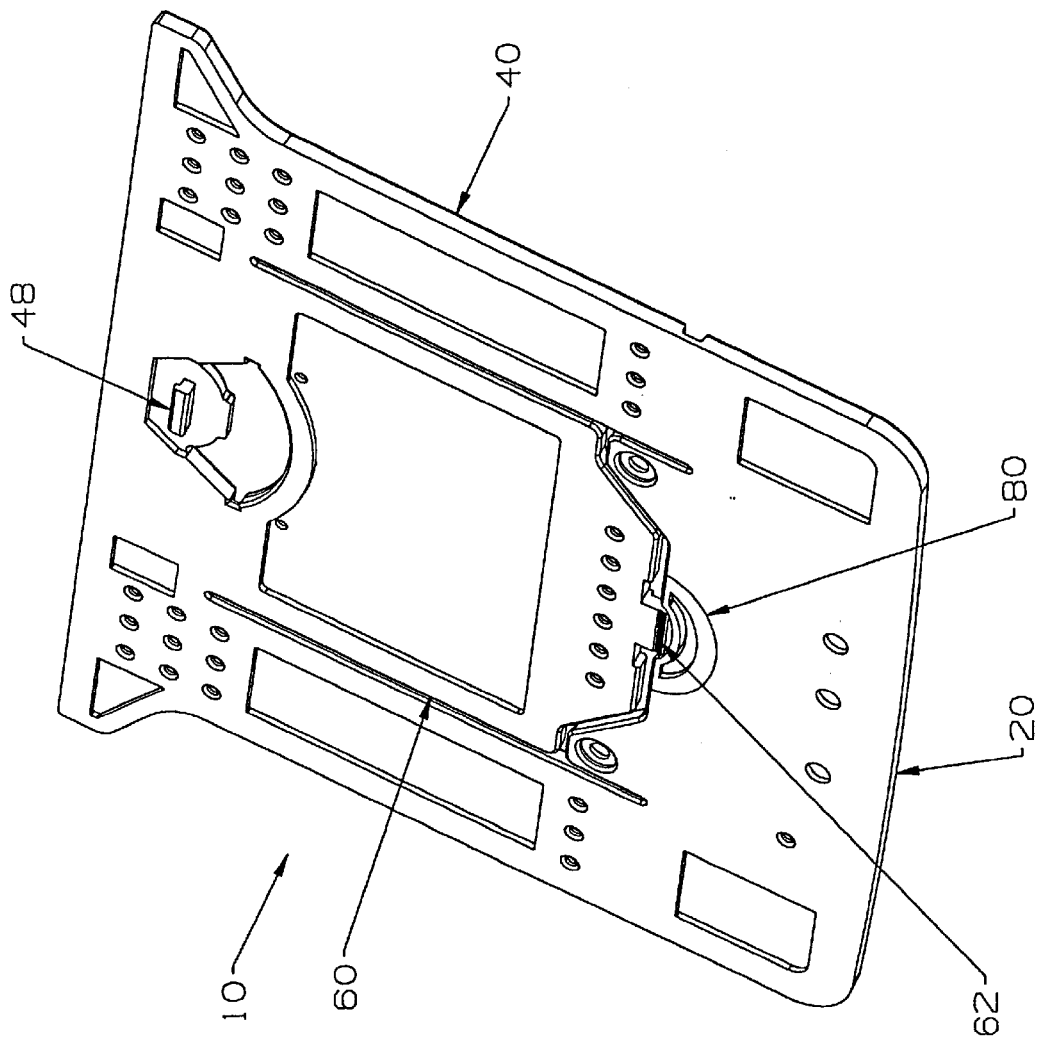
FIG. 2 is a perspective view of the support stand in a closed position as seen from above.

Referring now to the drawings, the support stand of the present invention is shown therein and indicated generally by the numeral 10. The support stand comprises three integrally formed support members, which are referred to herein as the base member 20, foot member 40 and support arm 60. The base member 20 attaches to the underside of an electronic device. The foot member 40 is pivotally connected to the base member 20. The support arm 60 is pivotally connected to the foot member 40. The base member 20, foot member 40 and support arm 60 all lie in a single plane against the underside of the electronic device when the support stand is in a closed or storage position. To use the support stand, the foot member 40 pivots downwardly away from the electronic device and the support arm 60 pivots upwardly. This position shall be referred to herein as the open or deployed position. In the deployed position, the electronic device is supported in an inclined position.

Base member 20, foot member 40 and support arm 60 are integrally formed using insert-molding technology. The base member 20, foot member 40 and support arm 60 each include a sheet metal insert indicated respectively by the numerals 30, 50 and 70 to provide the necessary strength and rigidity to support the design mode when in use. A covering made of a thermoplastic material, is molded around the inserts 30, 50, 70. The covering material not only encapsulates the inserts 30, 50, 70, but also forms live hinges 90, 92, 94, 96 between the individual support members 20, 40, 60.

Figure 3:
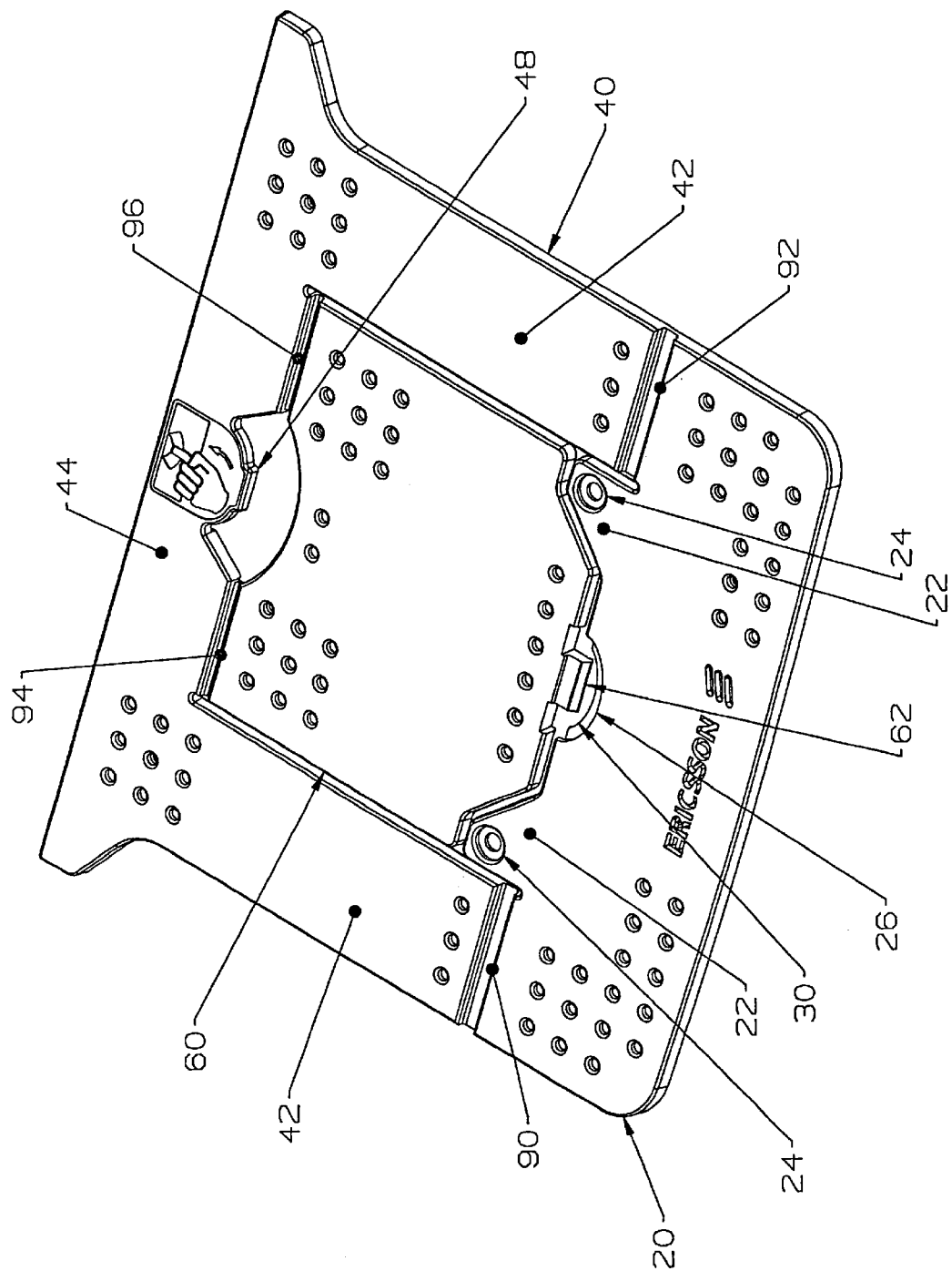
FIG. 3 is a perspective view of the support stand as seen from above with the retainer removed.
Figure 4:
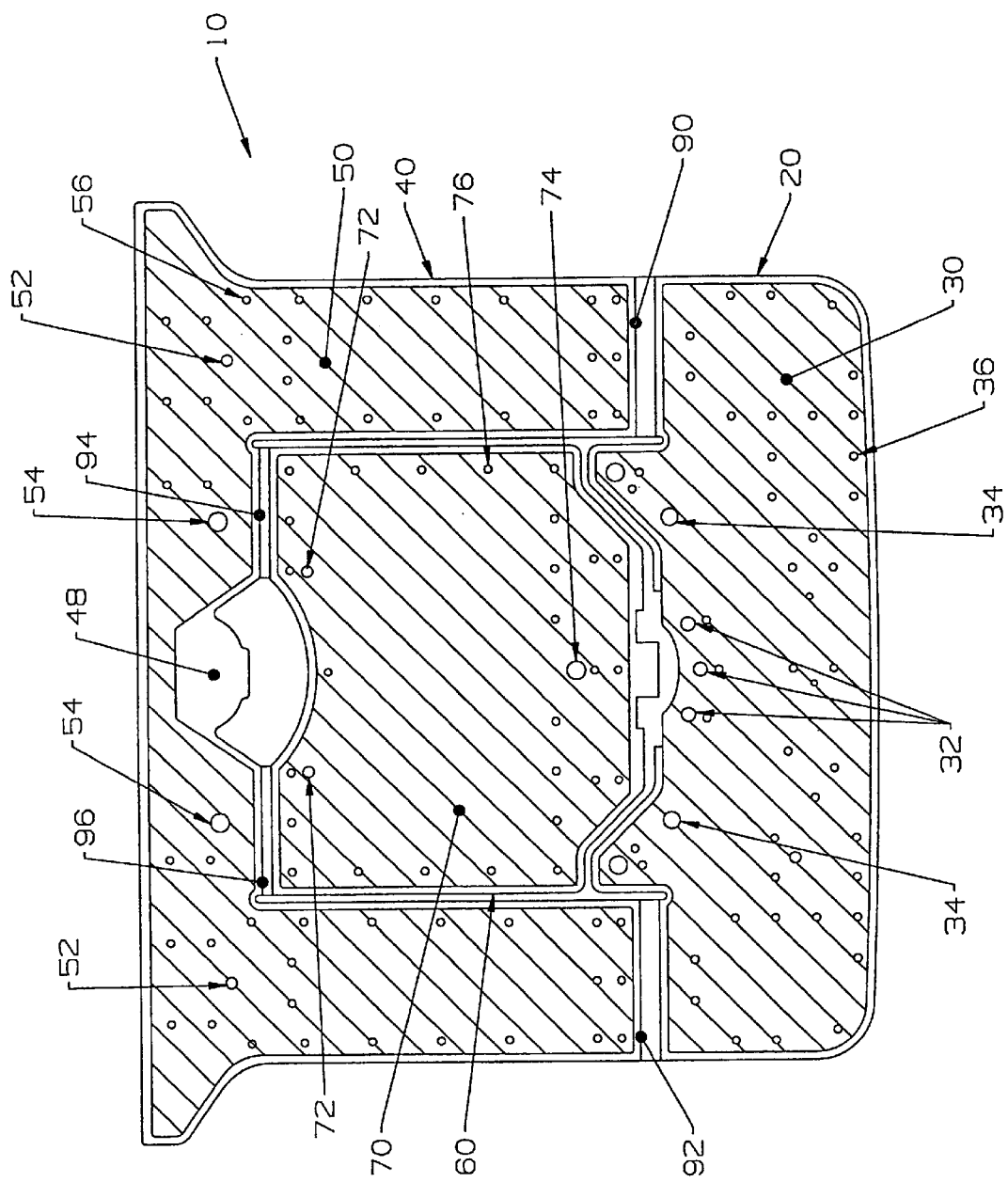
FIG. 4 is a section view of the support stand.

The base member 20 has a generally rectangular configuration that extends along the bottom edge of the support stand as shown in FIG. 3. The base member 20 includes a pair anchor tabs 22 which are spaced along the top edge of the base member 20. Each anchor tab includes an anchor hole 24. The function of the anchor tabs 22 is to secure the base member 20 to the electronic device. Anchor screws (not shown) pass through the anchor holes 24 in the anchor tabs 22 and thread into corresponding openings in the bottom side of the electronic device housing. A notch 26 is disposed midway between the anchor tabs 22. A portion of the base member insert 30 bordering the notch 26 is exposed as shown in FIG. 3. The exposed portion of the base member insert 30 is also notched and includes three openings 32 whose function is to secure the retaining member 80 as will be described below.

The foot member 40 has a generally U-shape configuration and includes a pair of leg portions 42 connected by a central portion 44. The outer end of each leg portion 42 is connected by living hinges 90, 92 to the base member 20. The live hinges 90, 92 allow the foot member 40 to rotate with respect to the base member 20. A latch 48 is integrally formed within a recess in the central portion 44 of the foot member 40. The latch 48 is adapted to engage a catch element 16 on the underside of the electronic device when the support stand is in a closed or storage position. The function of the latch 48 is to retain the support stand in the closed position when it is not in use. The latch 48 is connected to the central portion 44 of the foot member 40 by narrow ties 46. The latch 48 is disengaged by lifting upwardly on the latch 48, twisting the latch 48 out of engagement with the catch element 16.

The support arm 60 has a generally rectangular configuration and is connected by hinges 94, 96 to the central portion 44 of the foot member 40. Hinges 94, 96 allow the support arm 60 to pivot relative to the foot member 40. A tongue 62 projects out from the edge opposite the hinges.

The tongue 62 cooperates with a retainer 80 attached to the base member 20 to retain the support arm 60 when the support stand 10 is disposed in the closed position. More particularly, the tongue 62 on the support arm 60 engages the retainer on the base member 20 when support stand is in the storage position to prevent the support arm 60 from pivoting downwardly relative to the foot member 40 and base member 20.

Figure 8:
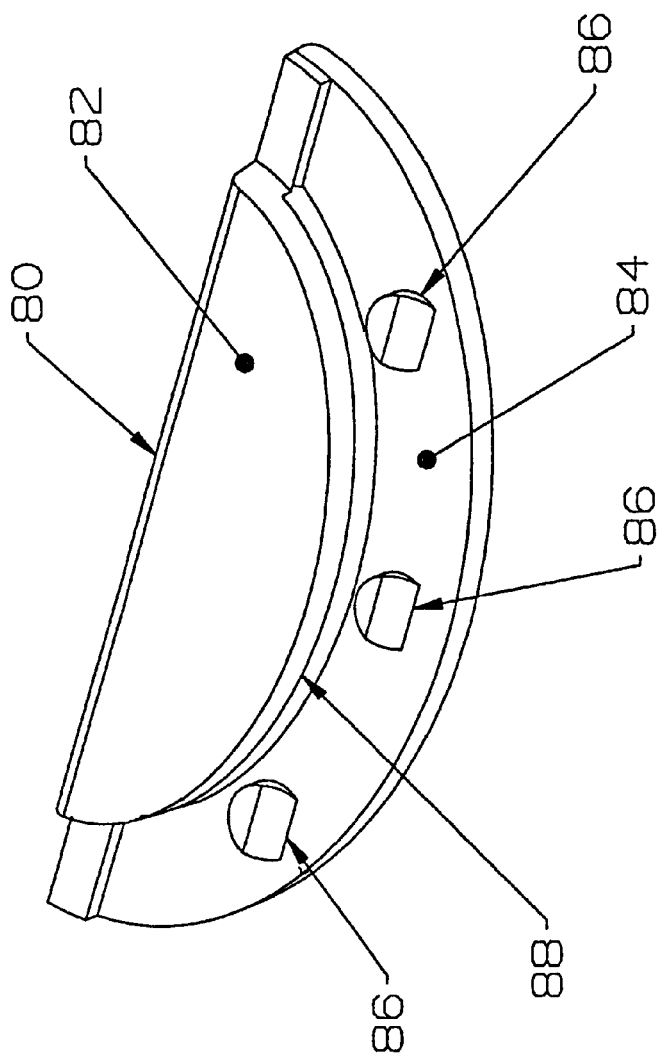
FIG. 8 is a perspective view of a molded plastic retainer, which forms a part of the support stand of the present invention.

Referring now to FIG. 8, the retainer 80 is shown. The retainer 80, as previously described, fits into the notch 26 in the base member 20. Retainer 80 is molded separately from the support members 20, 40 and 60. The retainer includes an inner portion 82 and outer portion 84 which are vertically spaced. A channel 88 is defined between the inner portion 82 and outer portion 84. The outer portion 84 includes three small teeth 86 whose function will become apparent.

The retainer 80 fits into the notch 26 in the base member 20 of the support stand 10 so that the straight edge is flush with the edge of the base member 20. The retainer 80 fits over the exposed portion of the base member insert 30 so that the inner portion 82 and outer portion 84 lie on opposite sides of the insert 30 and with the edge of the insert 30 captured in the channel 88 between the inner and outer portions 82 and 84. The teeth 86 on the outer portion 84 engage the small openings 32 in the insert to secure the retainer to the base member 20. Thus the teeth 86 function like detents to secure the retainer 80 to the base member 20.

As previously described, the function of the retainer 80 is to prevent the support arm 60 from falling away from the electronic device when the support stand is in the closed position. The retainer 80 overlaps the tongue 62 on the support arm 60 and traps the support arm 60 against the underside of the electronic device. The retainer 80 is molded separately from the support members 20, 40 and 60 and attached as described above.

To make the support stand 10 of the present invention, the inserts 30, 50 and 70 are loaded into an injection mold. The inserts 30, 50 and 70 are supported in the mold by pins that extend through holes in the inserts 30, 50 and 70. In the base member insert 30, the support pins of the mold extend through the anchor holes 24 in the insert 30. The foot member insert 50 and support arm insert 70 each include separate pin holes 52, 72. Supporting the inserts 30, 50 and 70 on support pins allows them to be properly located and supported during the molding process.

A soft durometer material, such as Santoprene or Hytrel, is molded around the inserts 30, 50, and 70. Flow ports 34, 54 and 74 are formed in the inserts 30, 50 and 70 to allow the material to flow on both sides of the inserts 30, 50 and 70 to encapsulate the inserts. The flow ports 34, 54 and 74 should be located in close proximity to the injection gates. A series of smaller openings 36, 56 and 76 are also formed in the inserts. These openings are filled during the molding process to lock the inserts 30, 50 and 70 in place. During the molding process, the plastic encapsulates and captures the inserts 30, 50 and 70 and joins the individual support members into a unitary assembly. The plastic material also forms live hinges 90, 92, 94, 96 between the support members as previously described. This avoids the need for pins or mechanical hinges.

To ensure that the inserts 30, 50 and 70 do not move when the plastic is injected at high pressure, stand-off features should be incorporated into the mold to prevent the inserts 30, 50 and 70 from moving. In this application, round pins have been found to be suitable for this purpose. As seen in the Figures, the stand-off pins leave a series of holes in the surface of the support members which contributes to its industrial appearance. The geometry and number of stand-off pins will depend on the choice of materials, the geometry of the inserts, injection pressures, injection temperatures and gate locations.

To complete the assembly, the retainer 80 is snapped into place on the base member 20. The retainer is molded separately from the support members because it must overlap the tongue 62 on the support arm 60.

The support stand 10 of the present invention can be used to support an electronic device 12 in an inclined position and provides a relatively large viewing angle as compared to prior art devices. When not in use, the stand 10 can be folded against the bottom of the device 12 or removed and stored.

Figure 5:
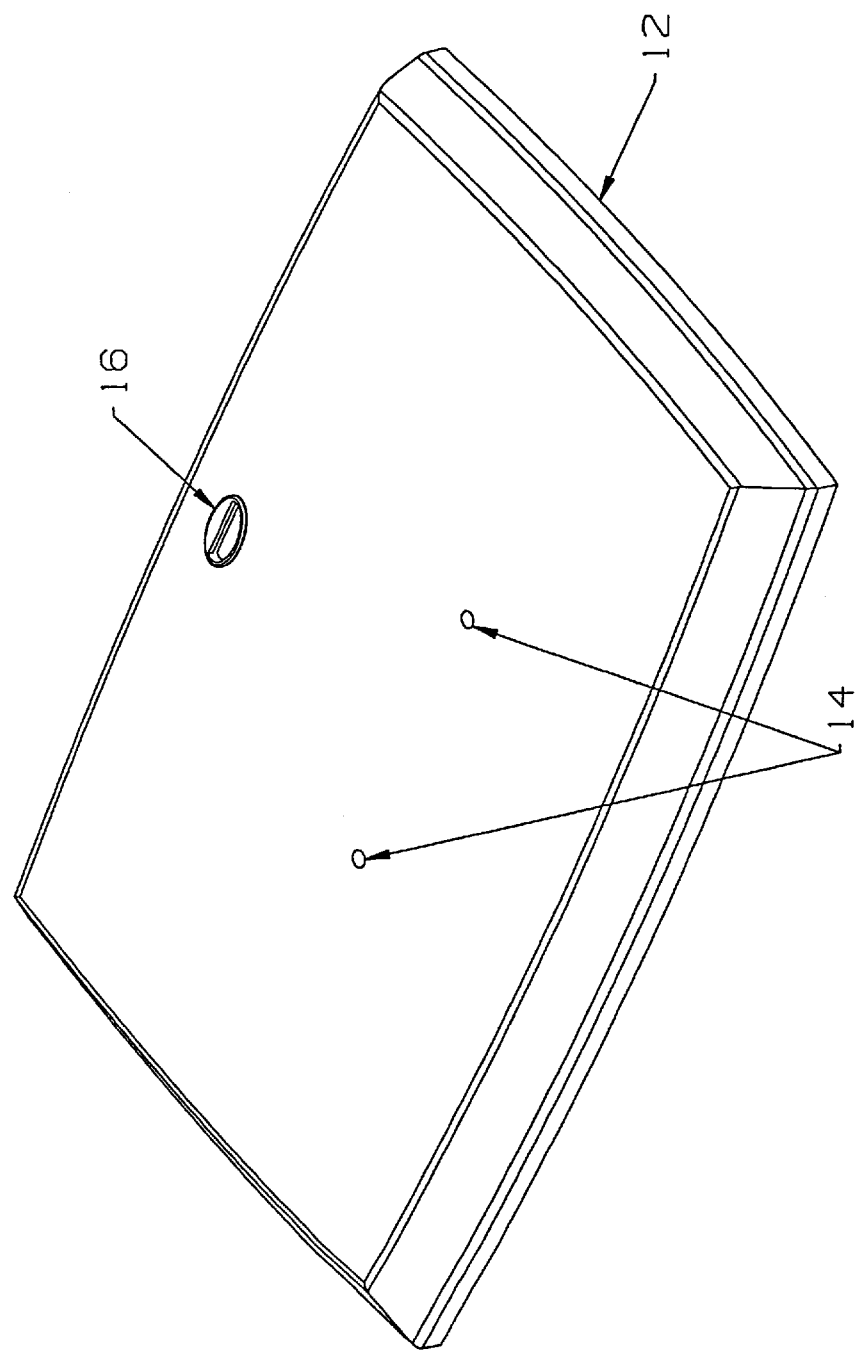
FIG. 5 is a perspective view showing the bottom of an electronic device supported by the support stand.

FIG. 5 shows the back of an electronic device indicated generally by the numeral 12 for which the stand 10 is designed. The device 12 includes two screw holes 14 and a catch 16 which cooperates with the latch 48 on the support stand 10. The stand 10 is attached to the back of the electronic device 12 by screws (not shown) that pass through the anchor holes 24 in the base member 20 and thread into the openings 14 in the back of the device 12. It will be appreciated, however, that the method of attaching the stand 10 to the device 12 is not an important part of the invention and that other methods of attachment can also be used. The base member 20 lies flat against the underside of the device 12.

Figure 6:
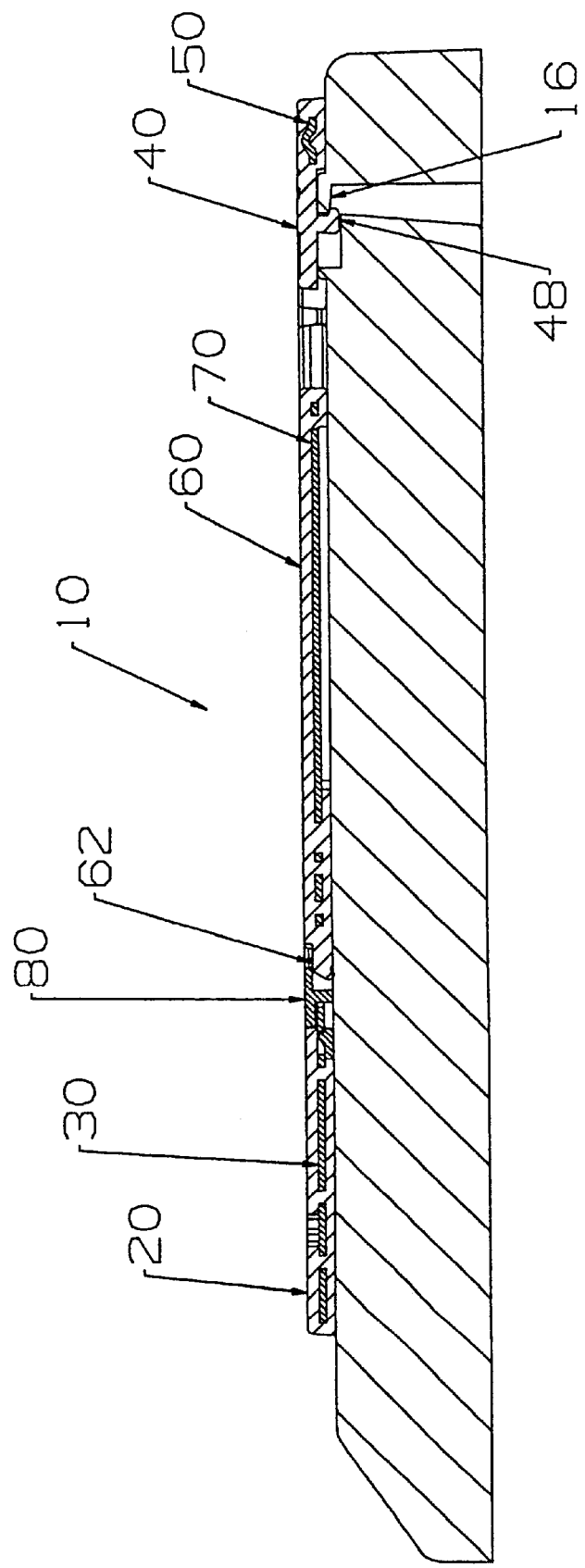
FIG. 6 is a section view of the support stand attached to an electronic device.

FIG. 6 shows the stand in a closed position. In the closed position, the base member 20, foot member 40 and support arm 60 lie flat against the back side of the supported device 12. The latch 48 on the foot member 40 engages with the catch 16 in the back of the device 12 to retain the support stand 10 in the closed position. The support arm 60 is captured against the underside of the device 12 by the retainer which overlaps the tongue 62 on the support arm 60.

Figure 7:
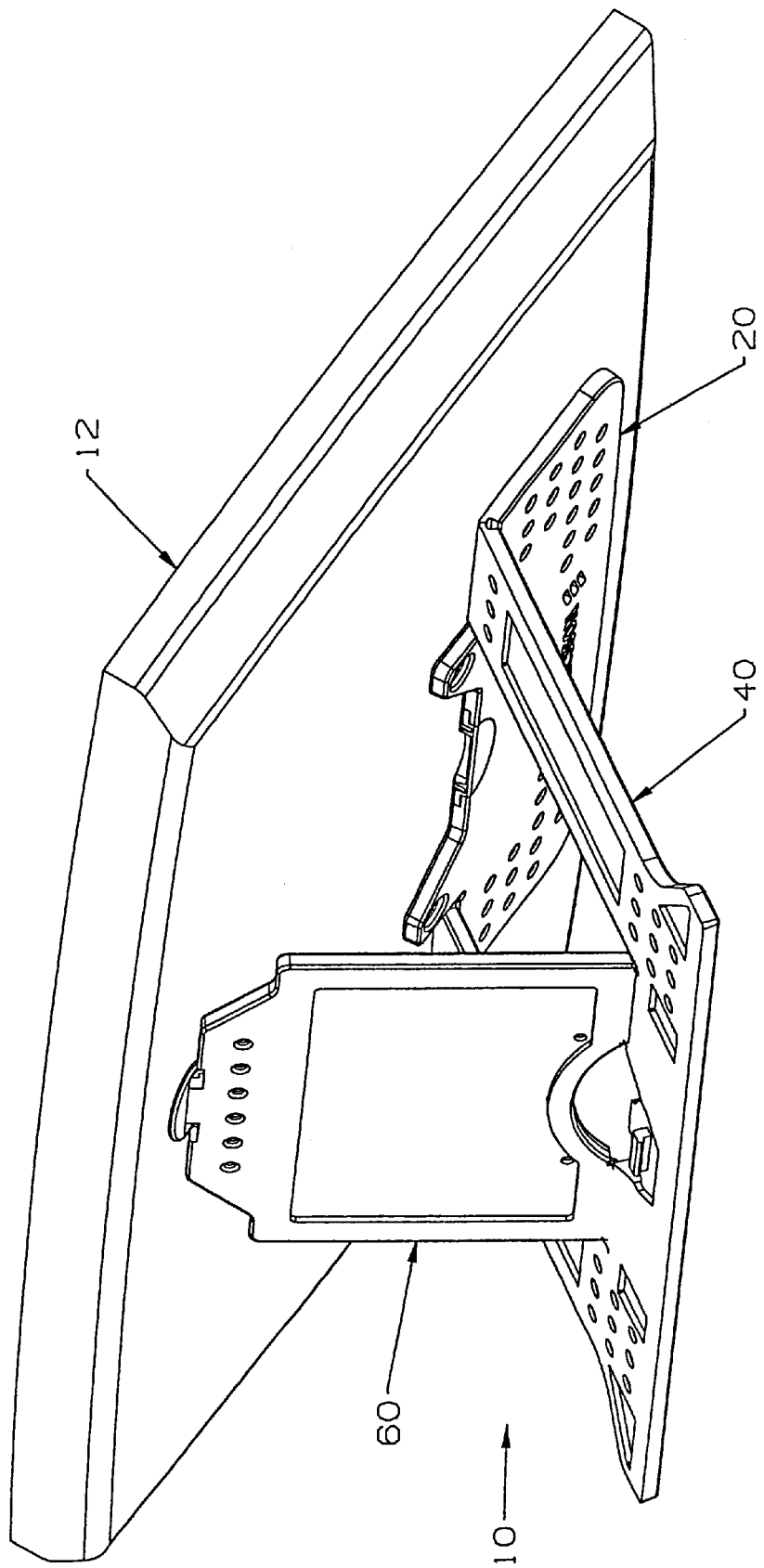
FIG. 7 is a perspective view of the support stand in a deployed position supporting an electronic device.

FIG. 7 shows the stand in the open or deployed position. In the open or deployed position, the base member 20 is held against the back of the device by the screws. The latch 48 on the foot member 40 is disengaged from the device 12 allowing the foot member 40 to swing down away from the back of the device 12. The foot member 40 pivots about hinges 90, 92 provided between the base member 20 and the foot member 40. The lower edge of the foot member 40 engages the underlying support surface. The support arm 60 is allowed to pivot upward about the hinges 94, 96 between the foot member 40 and the support arm 60. The tongue 62 on the support arm engages the catch 16 on the supported device 12 or some other feature in the supported device. It will be appreciated by those skilled in the art that a series of spaced apart features could be provided in the device 12 to allow the device to be supported at a variety of different angles.

Based on the forgoing, it is apparent that the present invention provides a stand which is suitable for small electronic devices which do not have sufficient space for recessed features, such as built-in support feet. The stand simply attaches to the back side of the supported device. When the stand is not needed, it can be folded against the back of the supported device. In the closed position, it is approximately 3 mm in thickness. It is small and unobtrusive, and can be remove when desired.

What is claimed is:

1. A support stand for an electronic device comprising:
   a) a plurality of generally planar support members pivotally connected to one another and adapted to attach to the said electronic device;
   b) wherein said support members are normally disposed in a storage position in which all said support members lie in a single plane against the electronic device;
   c) wherein said support members are movable to a support position in which at least one of said support members is pivoted away from said electronic device and engages with an underlying support surface so that the electronic device is supported in an inclined position by said support members; and
   d) a latch engageable with said electronic device for securing said stand in the storage position.

2. The support stand according to claim 1 further including lives hinges pivotally connecting said support members.

3. The support stand according to claim 1, wherein said support member includes an insert made of a rigid sheet material and an outer cover made of a thermoplastic material formed around said insert.

4. A support stand for an electronic device comprising:
   a. a generally planar base member adapted to attach to said electronic device;
   b. a generally planar foot member having a first edge pivotally connected to said base member and a second edge adapted to engage a support surface, said foot member being movable between a storage position in which said foot member is coplanar with said base member and a support position in which said foot member extends generally downward from said base member so that said second edge of said foot member engages said support surface; and
   c. a generally planar support member having a first edge pivotally connected to said foot member and a second edge adapted to engage said electronic device, said support member being movable between a storage position in which said support member is coplanar with said base member and said foot member, and a support position in which said support member extends generally upward from said foot member so that said second edge engages said electronic device at a distance from said base member.

5. The support stand according to claim 4 further including a latch engageable with said electronic device for securing said stand in a storage position.

6. The support stand according to claim 5 wherein said latch is on said foot member of said stand.

7. The support stand according to claim 4 further including a catch element on said support member to engage said electronic device when said support member is in the support position.

8. The support stand according to claim 7 wherein said catch element comprises a tab disposed along the second edge of said support member.

9. The support stand according to claim 8 further including a stop disposed on said base member to engage said catch element and retain said support member when said stand is in said storage position.

10. The support stand according to claim 4 further including live hinges pivotally connecting said foot member to said base member, and said support member to said foot member.

11. The support stand according to claim 4, wherein said base member, said foot member and said support member each include an insert made of a rigid sheet material and an outer cover made of a thermoplastic material formed around said insert.

12. A electronic device comprising:
   a. a housing containing electronics;
   b. a generally planar base member adapted to attach to said housing;
   c. a generally planar foot member having a first edge pivotally connected to said base member and a second edge adapted to engage a support surface, said foot member being movable between a storage position in which said foot member is coplanar with said base member and a support position in which said foot member extends generally downward from said base member so that said second edge of said foot member engages said support surface; and
   c. a generally planar support member having a first edge pivotally connected to said foot member and a second edge adapted to engage said housing, said support member being movable between a storage position in which said support member is coplanar with said base member and said foot member, and a support position in which said support member extends generally upward from said foot member so that said second edge engages said housing at a distance from said base member.

13. The support stand according to claim 12 further including a latch engageable with said housing for securing said stand in a storage position.

14. The support stand according to claim 13 wherein said latch is on said foot member of said stand.

15. The support stand according to claim 12 further including a catch element on said support member to engage said housing when said support member is in the support position.

16. The support stand according to claim 15 wherein said catch element comprises a tab disposed along the second edge of said support member.

17. The support stand according to claim 16 further including a stop disposed on said base member to engage said catch element and retain said support member when said stand is in said storage position.

18. The support stand according to claim 12 further including live hinges pivotally connecting said foot member to said base member, and said support member to said foot member.

19. The support stand according to claim 12, wherein said base member, said foot member and said support member each include an insert-made of a rigid sheet material and an outer cover made of a thermoplastic material formed around said insert.

20. A housing for an electronic device comprising:
   a. a front cover and a back cover;
   b. a generally planar base member adapted to attach to said back cover;
   c. a generally planar foot member having a first edge pivotally connected to said base member and a second edge adapted to engage a support surface, said foot member being movable between a storage position in which said foot member is coplanar with said base member and a support position in which said foot member extends generally downward from said base member so that said second edge of said foot member engages said support surface; and
   d. a generally planar support member having a first edge pivotally connected to said foot member opposite said base member and a second edge adapted to engage said back cover, said support member being movable between a storage position in which said support member is coplanar with said base member and said foot member, and a support position in which said support member extends generally upward from said foot member so that said second edge engages said back cover at a point distant from said base member.

21. The support stand according to claim 20 further including a latch engageable with said back cover for securing said stand in a storage position.

22. The support stand according to claim 21 wherein said latch is on said foot member of said stand.

23. The support stand according to claim 20 further including a catch element on said support member to engage said back cover when said support member is in the support position.

24. The support stand according to claim 23 wherein said catch element comprises a tab disposed along the second edge of said support member.

25. The support stand according to claim 24 further including a stop disposed on said base member to engage said catch element and retain said support member when said stand is in said storage position.

26. The support stand according to claim 20 further including live hinges pivotally connecting said foot member to said base member, and said support member to said foot member.

27. The support stand according to claim 20, wherein said base member, said foot member and said support member each include an insert made of a rigid sheet material and an outer cover made of a thermoplastic material formed around said insert.

* * * * *